United States Patent
Kodimer (10) Patent No.: US 9,794,433 B1
(45) Date of Patent: Oct. 17, 2017

(54) SYSTEM AND METHOD FOR REMOTE MONITORING OF DOCUMENT PROCESSING DEVICES

(71) Applicants: Kabushiki Kaisha Toshiba, Minato-ku (JP); Toshiba TEC Kabushiki Kaisha, Shinagawa-ku (JP)

(72) Inventor: Marianne L. Kodimer, Huntington Beach, CA (US)

(73) Assignees: Kabushiki Kaisha Toshiba, Minato-ku (JP); Toshiba TEC Kabushiki Kaisha, Shinagawa-ku (JP)

(*) Notice: Subject to any disclaimer, the term of this patent is extended or adjusted under 35 U.S.C. 154(b) by 0 days.

(21) Appl. No.: 15/134,088

(22) Filed: Apr. 20, 2016

(51) Int. Cl.
| | |
|---|---|
| G06F 3/12 | (2006.01) |
| H04N 1/00 | (2006.01) |
| H04L 12/24 | (2006.01) |
| H04L 29/08 | (2006.01) |
| H04L 12/26 | (2006.01) |
| G06K 15/00 | (2006.01) |

(52) U.S. Cl.
CPC ..... *H04N 1/00344* (2013.01); *H04L 41/0803* (2013.01); *H04L 43/08* (2013.01); *H04L 67/1097* (2013.01); *H04N 1/00042* (2013.01); *H04N 1/00347* (2013.01); *H04N 1/00411* (2013.01); *H04N 1/00427* (2013.01); *H04N 1/00938* (2013.01); *H04N 2201/0039* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 2011/0216359 A1* | 9/2011 | Kamisuwa | G06F 3/12 358/1.15 |
| 2013/0114100 A1* | 5/2013 | Torii | G06F 11/0733 358/1.14 |
| 2015/0146239 A1* | 5/2015 | Anderson | G01S 5/02 358/1.15 |

* cited by examiner

*Primary Examiner* — Dov Popovici
(74) *Attorney, Agent, or Firm* — Ulmer & Berne LLP (57) ABSTRACT

A system and method for servicing of devices includes a processor, associated memory and a user interface including a display. A display generator generates images on the display. The memory stores device data for each of a plurality of serviceable devices. Device data for each device includes a unique device identifier and associated device status data. The display generator is displays an image including a device data list on the display. The user interface receives filter data from an associated user and the processor generates a subset of the device data in accordance with received filter data. The processor generates a label corresponding to the subset and stores the label in the memory. The processor further receives a device inquiry from the associated user via the user interface, and the display generator generates a labeled display image including the label responsive to a received device inquiry.

20 Claims, 9 Drawing Sheets

SYSTEM AND METHOD FOR REMOTE MONITORING OF DOCUMENT PROCESSING DEVICES

TECHNICAL FIELD

This application relates generally to monitoring and servicing of devices. The application relates more specifically to a system and method to facilitate efficient and organized administration or maintenance of multifunction peripherals.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). MFPs are used in connection with example embodiments disclosed in detail below, but it is to be appreciated that any suitable document processing device can be used.

Given the expense in obtaining and maintain MFPs, devices are frequently shared among users via a data network. Users may send document processing jobs, such as a print request, to one or more networked devices. In a typical shared device setting, one or more workstations are connected via a network. When a user wants to print a document, an electronic copy of that document is sent to a document processing device via the network. The user may select a particular device when several are available. Companies may have several or many MFPs available for employee use. The devices maybe distributed on one or more floors or at one or more locations. Jobs may be routed to other available MFPs for processing.

MFPs require periodic maintenance for reasons including device failure or depletion of supplies such as paper, toner, ink or staples. While some maintenance procedures are straightforward, many are complex and require the services of a trained technician. When devices are distributed among different locations, monitoring or maintenance can require significant resources, and having a dedicated technician may not be justifiable or cost effective.

Companies may outsource device maintenance to a service company. Service technicians can be notified by the company when maintenance is required. More recently, devices are networked and include an ability to send a message, such as an e-mail, to a technician charge with maintaining a device when service is required. Service may be due to things such as device failure, but may also include regularly scheduled maintenance intervals. Such intervals may be based on time passage, or may be based on machine usage, such as number of copies made. Many devices include counters or other gauges which may communicate status information via an associated network.

It is highly desirable for service technicians to be as efficient as possible. Device outages can lead to lost productivity. Increased efficiency allows for more responsive servicing, and maximizes technician utilization.

SUMMARY

In accordance with an example embodiment of the subject application, a system and method for servicing of devices includes a processor, associated memory and a user interface including a display. A display generator generates images on the display. The memory stores device data for each of a plurality of serviceable devices. Device data for each device includes a unique device identifier and associated device status data. The display generator is displays an image comprised of a device data list on the display. The user interface receives filter data from an associated user and the processor generates a subset of the device data in accordance with received filter data. The processor generates a label corresponding to the subset and stores the label in the memory. The processor further receives a device inquiry from the associated user via the user interface, and the display generator generates a labeled display image including the label responsive to a received device inquiry.

BRIEF DESCRIPTION OF THE DRAWINGS

Various embodiments will become better understood with regard to the following description, appended claims and accompanying drawings wherein:

DETAILED DESCRIPTION

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

Figure 1:
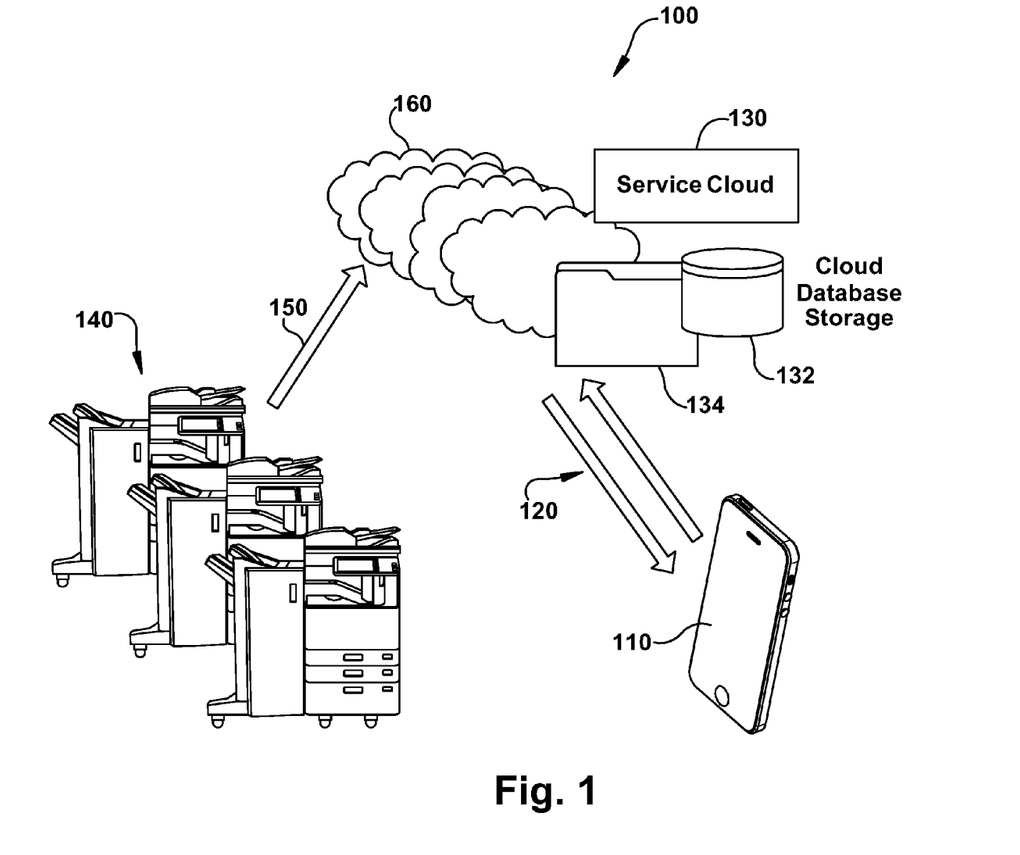
FIG. 1 an example embodiment of a device monitoring or servicing tool.

Turning first to FIG. 1, illustrated is an example embodiment of a device monitoring or servicing tool 100. A user device 110 is suitably comprised of any computing device, such as a workstation, laptop, tablet or smartphone, and is available for use by a service technician or network administrator. In the illustrated example, the user device 110 is comprised of a tablet computer in data communication with a network 160 via a wireless or wired connection. By way of further example, wireless connection may be via WiFi, Bluetooth, optical or cellular data paths, or any suitably combination thereof. Network connectivity may include a local area network (LAN) or a wide area network (WAN), which may include the Internet, or any suitable combination thereof.

In the example of FIG. 1, tablet 110 is in data communication 120 with one or more service clouds, such as service cloud 130. Service cloud 130 includes one or more servers and network accessible data storage 132 for storage of data records 134. Data records 134 comprise information about various serviceable devices that are accessible or viewable by a technician. In the illustrated example, data records 134 correspond to a plurality of document processing devices illustrated by MFPs 140. The MPFs 140 may be distributed throughout one or more locations. The MFPs 140 include a data connection 150 to service cloud 130, such as via a network connection. MFPs 140 can upload device data, such as status data to service cloud 130. Such upload may be driven by a maintenance event service interval. Device data may also be uploaded upon a prompt to the device, suitably via the network 160. The prompt may be initiated by or through the service cloud 130, or by a direct prompt such as may be issued by a service technician.

An identifier is associated with each device and its device data. Any suitable identifier may be used, including device serial number or a supplied device name. Thus, device data may be received and viewed associatively with the device identifier to be available to a technician. Device identifier data may also include a name of the location where the device is installed, such as a company name, or a geographic location of the device. The location may be preset, or determined via any suitable geolocation or premises location system.

Figure 2:
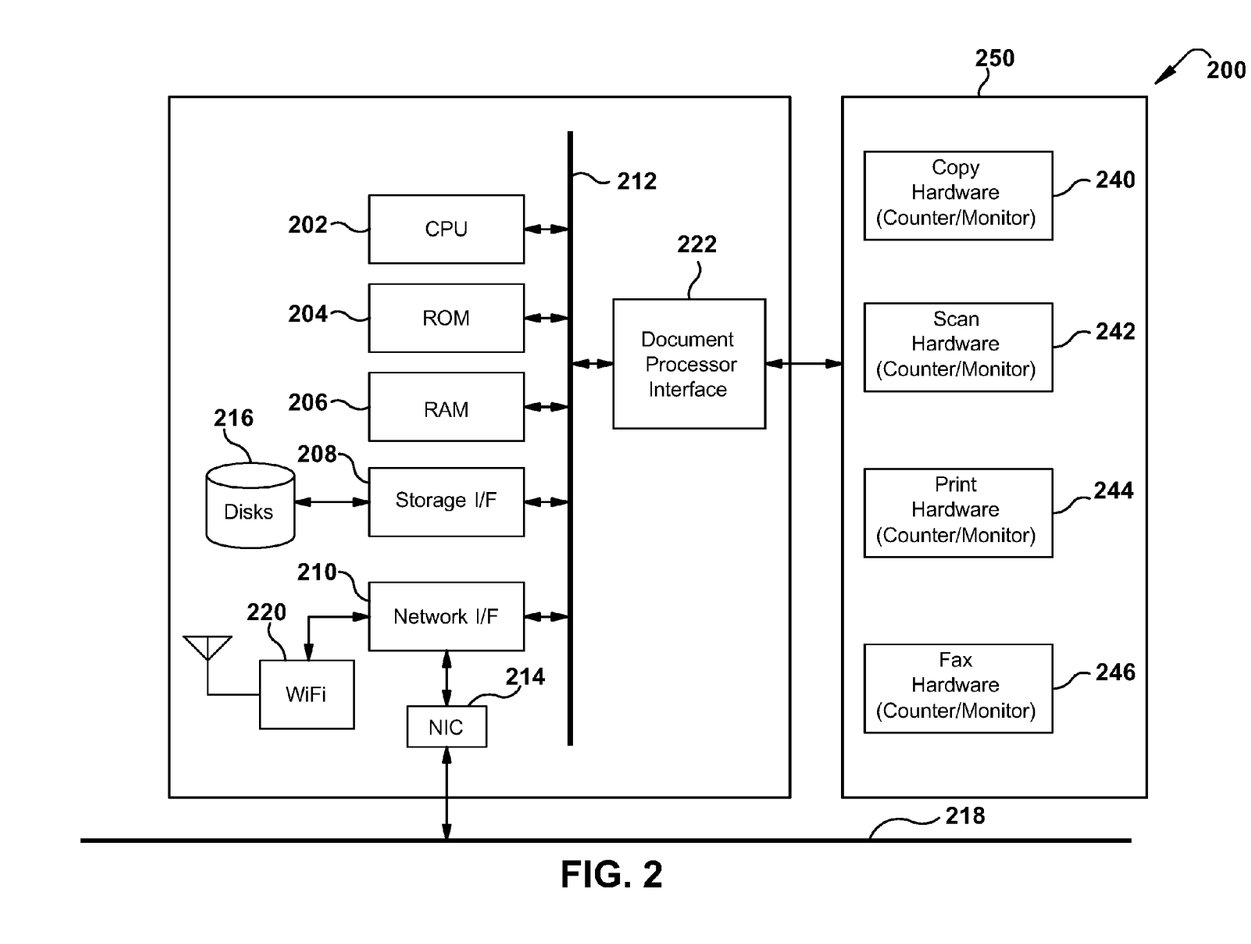
FIG. 2 is an example embodiment of a document rendering system

Turning now to FIG. 2, illustrated is an example of a document rendering system 200 suitably comprised within an MFP, such as with MFPs 140. Included are one or more processors, such as that illustrated by processor 202. Each processor is suitably associated with non-volatile memory, such as ROM 204, and random access memory (RAM) 206, via a data bus 212.

Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 218, or to a wireless data connection via wireless network interface 220. Example wireless connections include cellular, Wi-Fi, Bluetooth, NFC, wireless universal serial bus (wireless USB), satellite, and the like. Example wired interfaces include Ethernet, USB, IEEE 1394 (FireWire), Lightning, telephone line, or the like. NIC 214 and wireless network interface 218 suitably provide for connection to an associated network 220.

Processor 202 can also be in data communication with any suitable user input/output (I/O) interface which provides data communication with user peripherals, such as displays, keyboards, mice, track balls, touch screens, or the like. Also in data communication with data bus 212 is a document processor interface 222 suitable for data communication with MFP functional units 250. In the illustrated example, these units include copy hardware 240, scan hardware 242, print hardware 244 and fax hardware 246 which together comprise MFP functional units 250. It will be understood that functional units are suitably comprised of intelligent units, including any suitable hardware or software platform.

Figure 3:
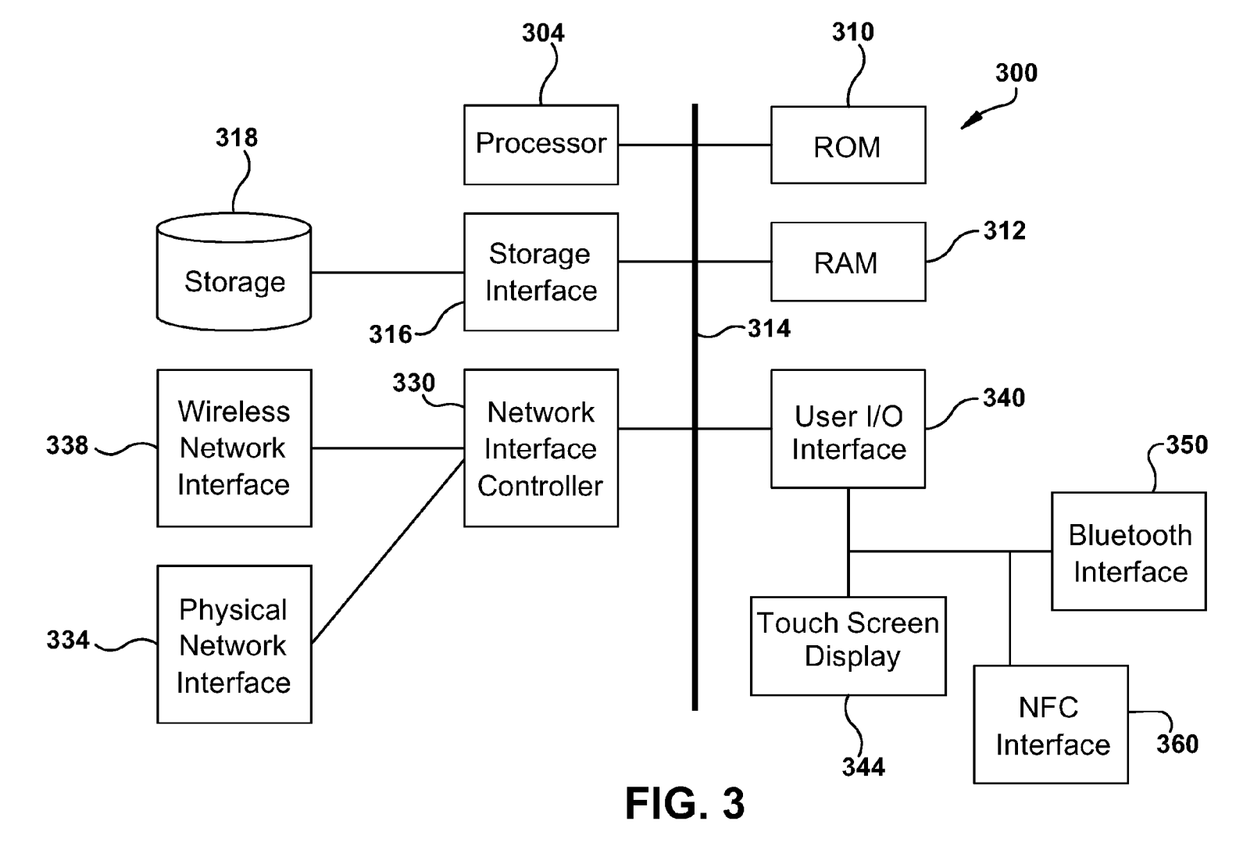
FIG. 3 is an example embodiment of a digital device.

Turning now to FIG. 3, illustrated is an example of a digital device system 300 suitably comprising personal or portable data devices, such as user device 110. Included are one or more processors, such as that illustrated by processor 304. Each processor is suitably associated with non-volatile memory, such as read only memory (ROM) 310 and random access memory (RAM) 312, via a data bus 314.

Processor 304 is also in data communication with a storage interface 316 for reading or writing to a data storage system 318, suitably comprised of a hard disk, optical disk, solid-state disk, or any other suitable data storage as will be appreciated by one of ordinary skill in the art.

Processor 304 is also in data communication with a network interface controller (NIC) 330, which provides a data path to any suitable wired or physical network connection via physical network interface 334, or to any suitable wireless data connection via wireless network interface 338. Example wireless connections include cellular, Wi-Fi, Bluetooth, NFC, wireless universal serial bus (wireless USB), satellite, and the like. Example wired interfaces include Ethernet, USB, IEEE 1394 (FireWire), telephone line, or the like.

Processor 304 is also in data communication with a user input/output (I/O) interface 340 which provides data communication with user peripherals, such as display 344, Bluetooth interface 350, or near-field communication interface 360, as well as keyboards, mice, track balls, touch screens, or the like. It will be understood that functional units are suitably comprised of intelligent units, including any suitable hardware or software platform.

Figure 4:
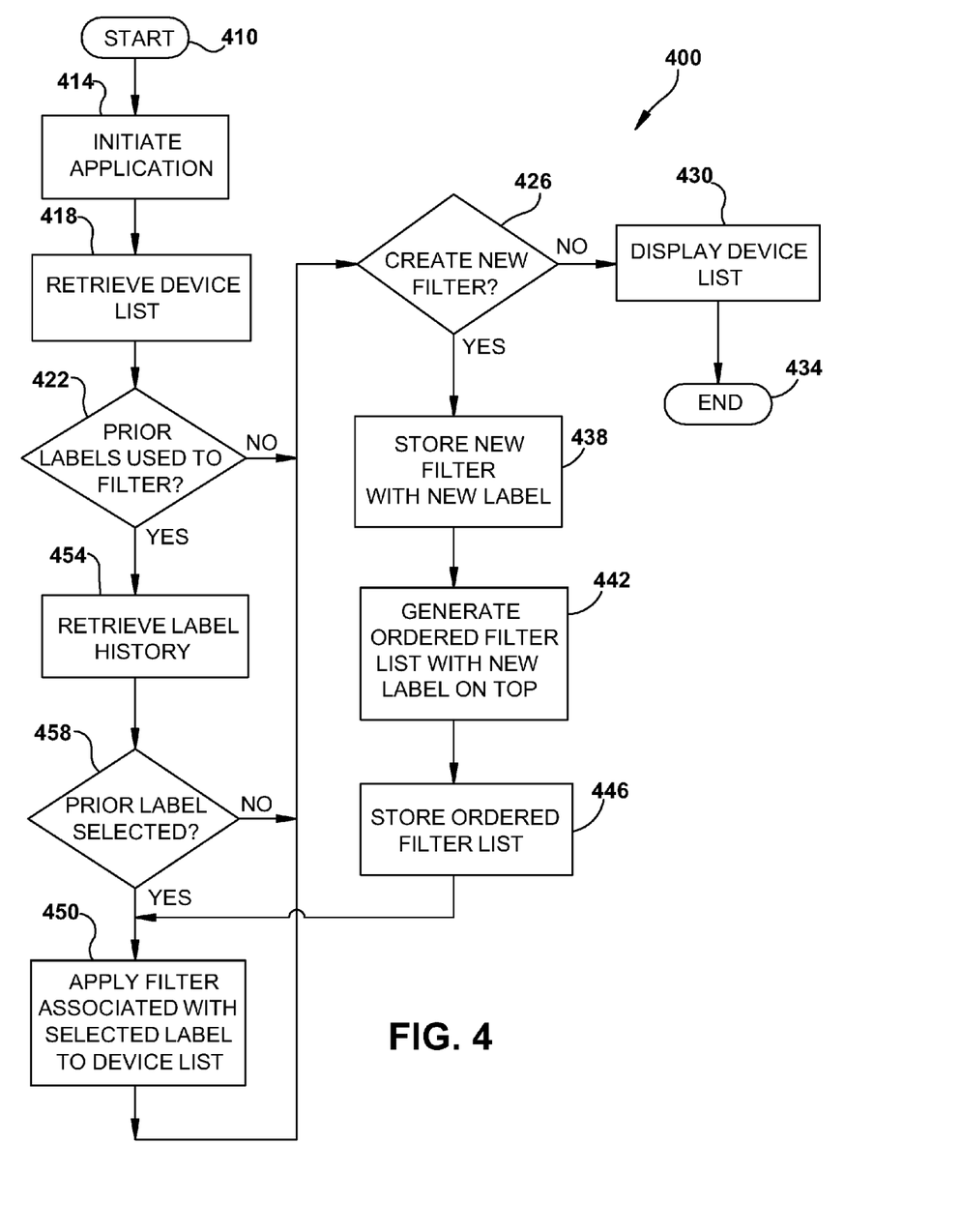
FIG. 4 is a flowchart of an example embodiment.

Referring now to FIG. 4, illustrated is a flowchart 400 suitably for operation via user device 110. It will be appreciated, however, that any suitable processing platform may be used. The process suitably commences at block 410, and an application is initiated or launched at block 414. A list of devices is retrieved at block 418. Such list is suitably obtained via a service cloud, or directly from one or more MFPs or other suitable data device. List data may be preassembled, built by polling MFPs, or built by periodic reporting initiated by MFPs. Next, a determination is made at block 422 as to whether prior labels have been associated with corresponding filtering of list data. If not, the process proceeds to block 426 where an inquiry is made as to whether a new filter is to be created.

If creation of a new filter is not selected, the process proceeds to block 430 where the device list is displayed, and the process ends at block 434. If creation of a new filter is selected at block 426, the new filter is obtained and stored with a new label at block 438. In a configuration, a filter can be based upon location, device type, service date, and so forth. In a configuration, the label can be checked against existing label, either from the same user or labels from other users. Labels can be harmonized and checked relative to associated data content. Labels can be required to use a standardized company labeling notation. Labeling can include device information such as location, device type, service date, and so forth. A new filter list is displayed at block 442, suitably with the newly created filter listed first as the most recently used filter as identified by its corresponding label. The process then proceeds to block 446 where the filter list is stored. The process then proceeds to block 450 where the filter associated with the label is applied to the device list. The process then suitably returns to block 426 to proceed as described above.

If prior labels were determined to have been used at block 422, the label history is retrieved and displayed at block 454. In a configuration, labels used by other users can be retrieved. In a configuration, the retrieved labels can be checked against other labels, for example to determine if one or more labels are duplicative. Labels can be harmonized, for example duplicative labels from the same user, or different users, can be reduced to a single label, for example a label using a standard company labeling notation. Labels can be check against similarly named labels, or analyzed relative to associated data content. A determination is made as to whether a prior label has been selected at block 458. If a prior label has been selected, the process returns to block 450 to proceed as described above. If a prior label has not been selected, the process returns to block 426 for processing as previously described.

Figure 5:
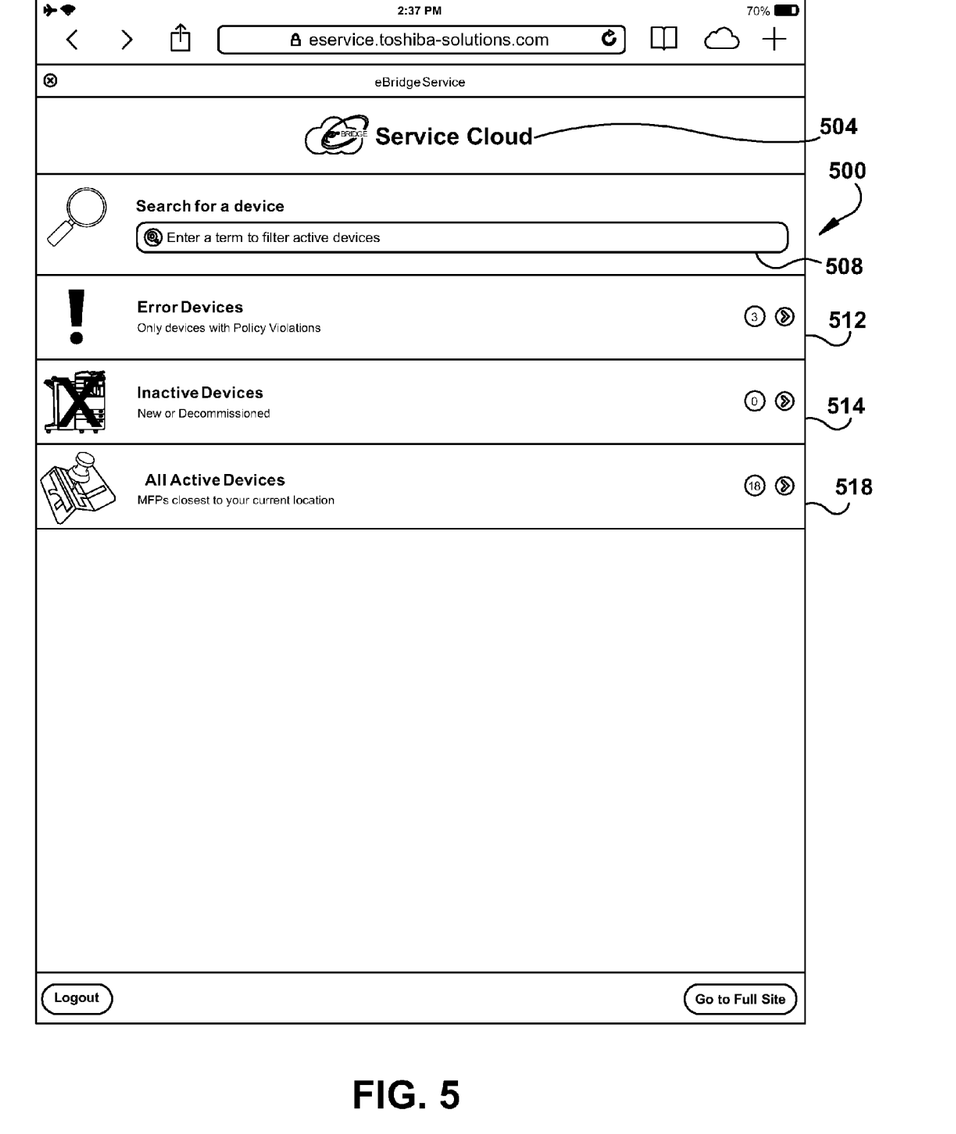
FIG. 5 is an example embodiment of a user interface.

FIG. 5 illustrates an example embodiment of a user interface 500, such as may appear on a touchscreen for user device 110, during execution of an associated application. In the illustrated example, a technician with a tablet or smartphone is presented with a display that shows connection to a service cloud at 504. As noted above, device data associated with devices such as MFPs is available for the user device via the service cloud. The technician is provided with options to search for a particular device in a search window 508. The technician can identify one particular device, a class of devices or devices that share one or more descriptive attributes. Preset filters are suitably included which may be frequently or universally used and displayed at startup or at all times. Examples include listing devices showing error conditions at 512, devices that are inactive at 514 or all actives devices at 518.

Figure 6:
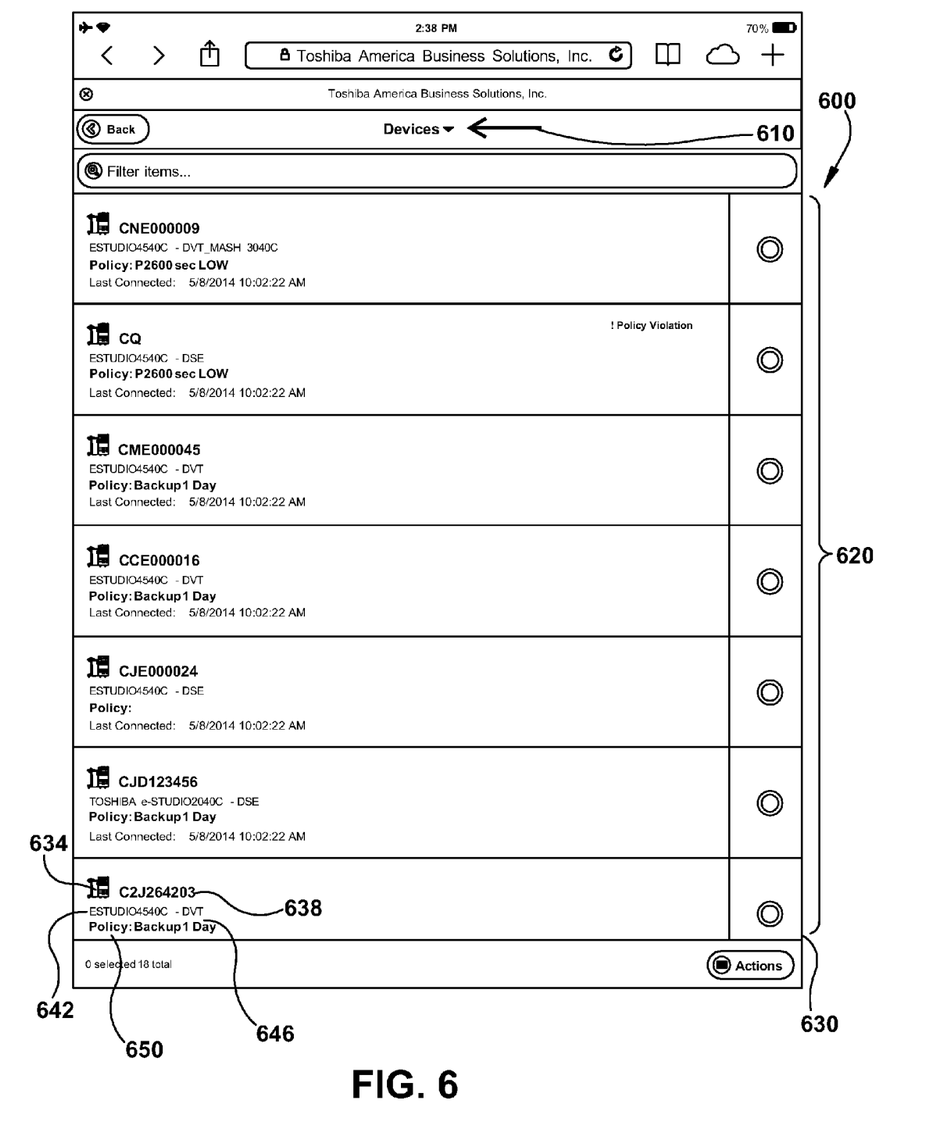
FIG. 6 is another example embodiment of a user interface.

Turning next to FIG. 6, illustrated is an example embodiment of a user interface 600 when a listing of devices has been selected as indicated at 610. The display shows a list of MFP devices at 620. In the illustrated example, each list entry includes several items of information. In example list entry 630, an icon 634 is indicative of the associated device. Included is a device name or identifier 638, a model identifier 642, a device location 646 and one or more policies 650 associated with the corresponding device. The displayed information is by way of example only. It will be appreciated that any suitable device information or identifier may be displayed, either with preset or user-selectable content.

Figure 7:
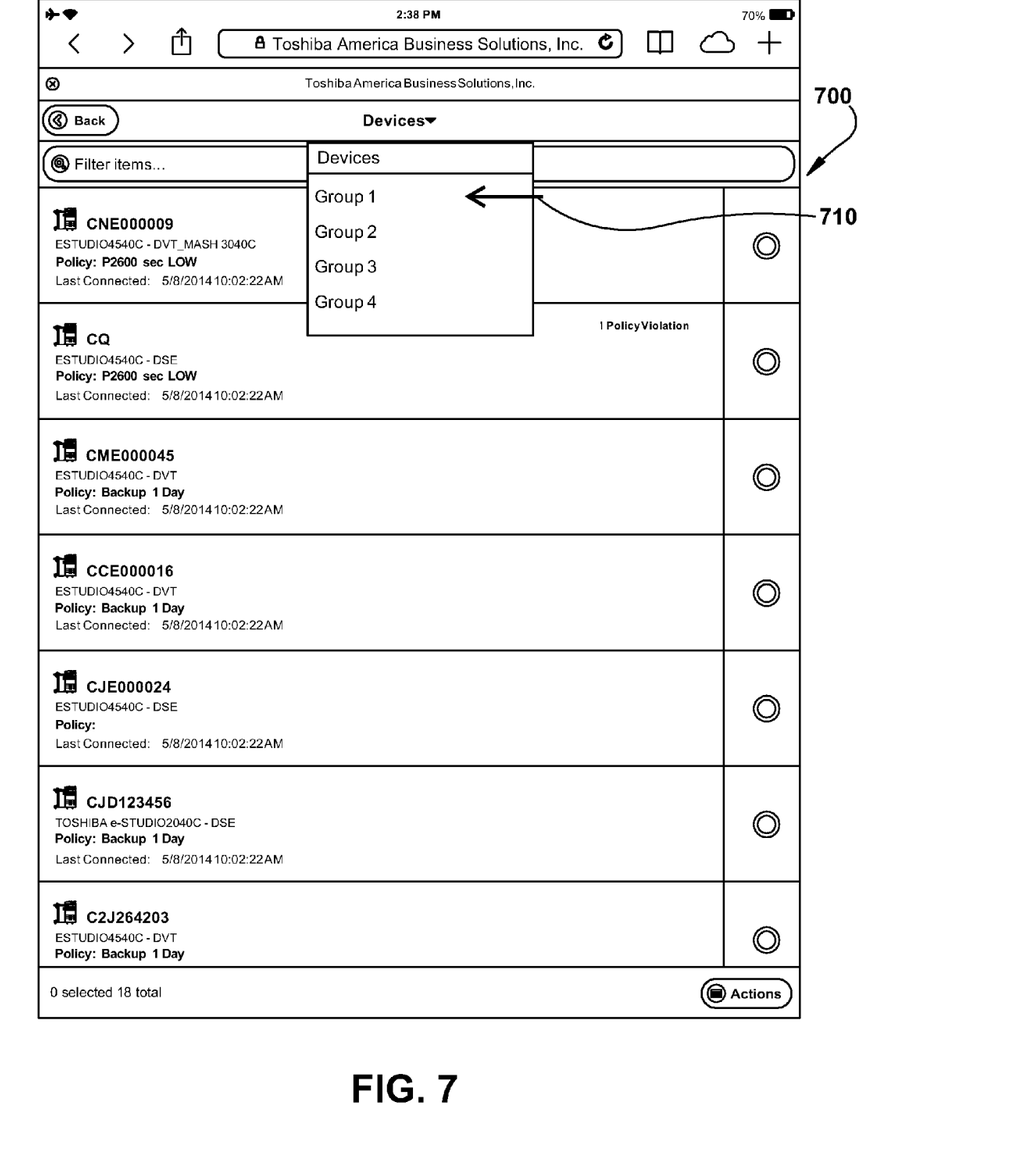
FIG. 7 is another example embodiment of a user interface.
Figure 8:
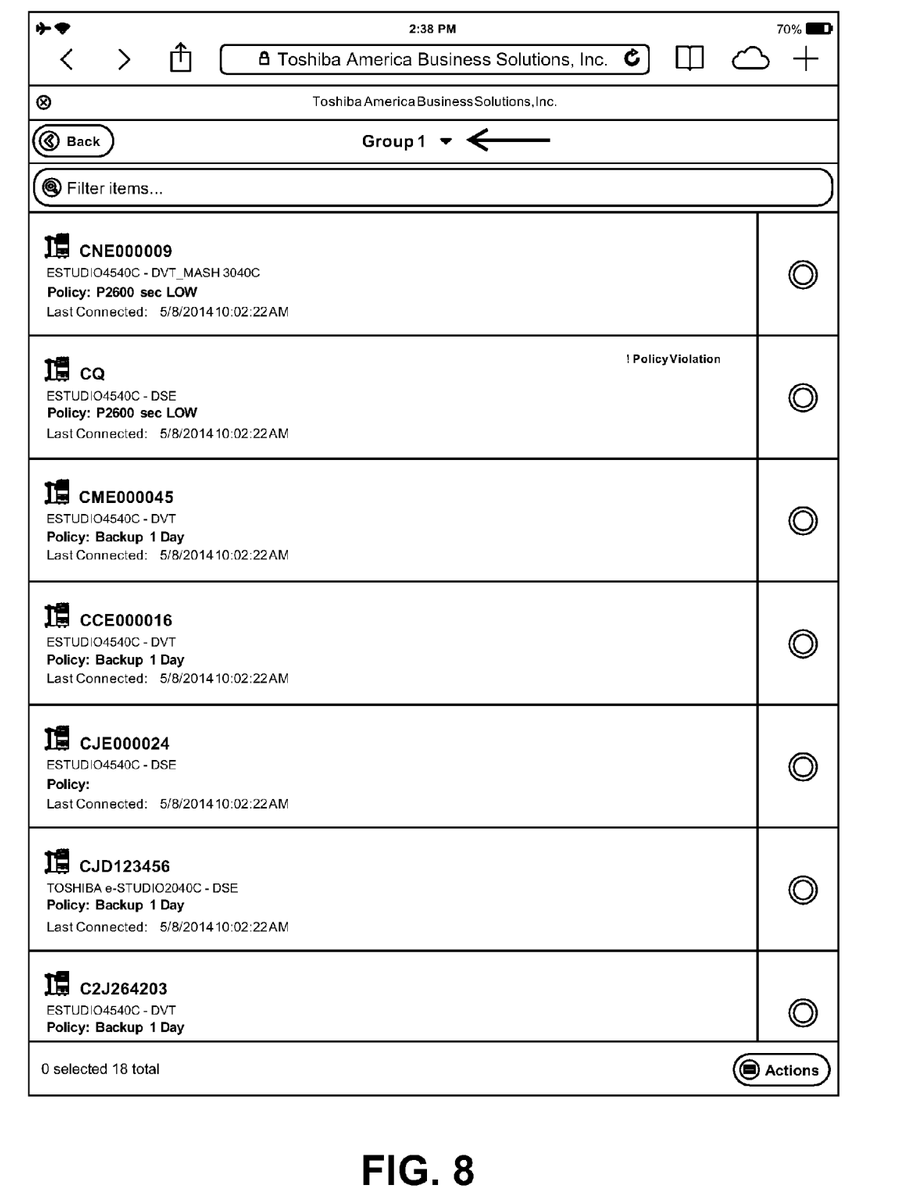
FIG. 8 is another example embodiment of a user interface.
Figure 9:
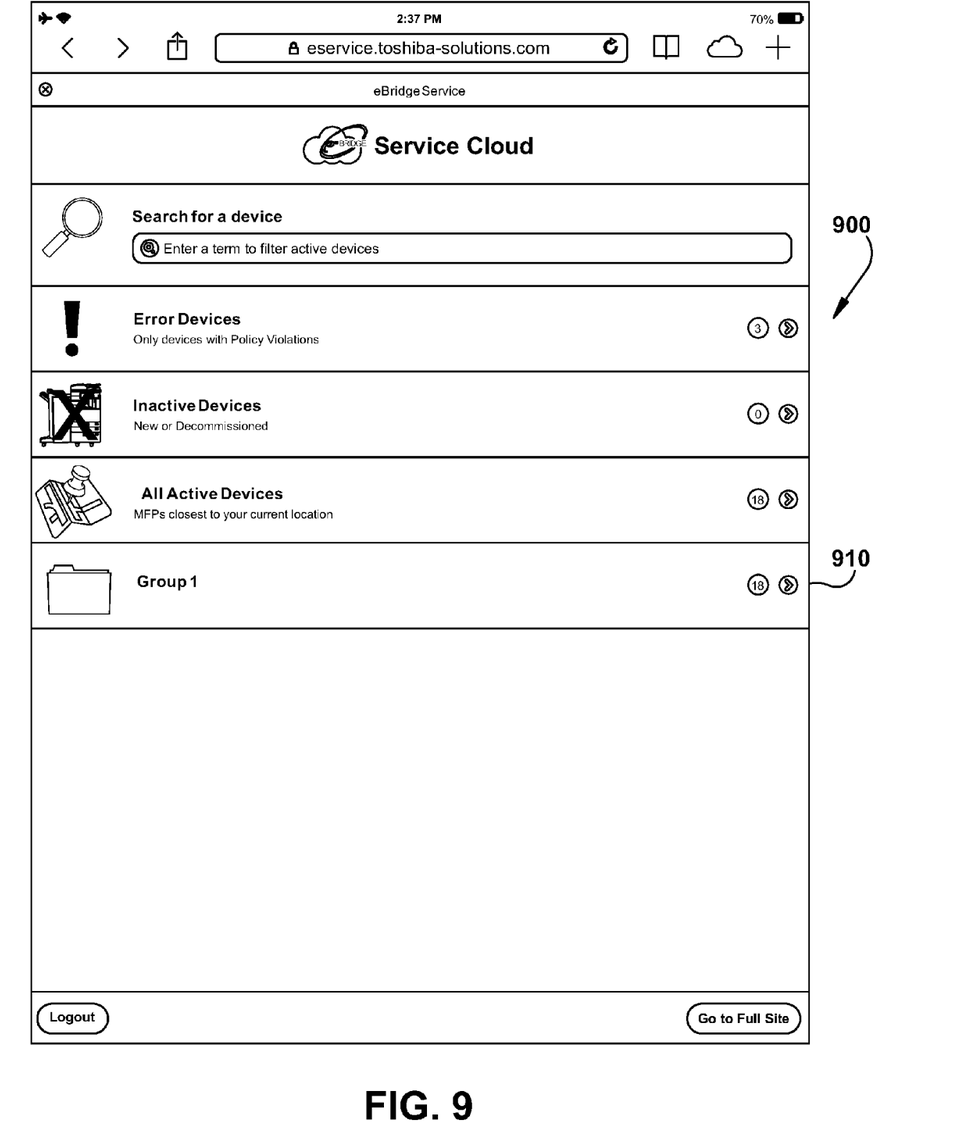
FIG. 9 is another example embodiment of a user interface.

FIG. 7 illustrates an example embodiment of user interface 700 wherein a display includes a listing of previously generated device labels 710 which are suitably selected by the technician. FIG. 8 illustrates an example embodiment of a display of devices in Group 1, selected in connection with the display of FIG. 7. The displayed listing of FIG. 8 is thus generated by application of a filter associated with Group 1. FIG. 9 illustrates an example embodiment of a user interface 900 wherein the default or base screen such as that in FIG. 5 has been updated with a label 910 displaying a selectable area for the recently selected Group 1 label. Other recently selected labels are suitably added as they are selected, with the most recently selected label advantageously provided at the top of the list, with the others being moved downward. Label listings are suitably appended until display space is used up, with the least recently used label being hidden. Alternatively, a scrollable list may be used to allow for hidden labels to be more easily accessed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A system comprising:
a processor and an associated memory,
the memory configured to store a device data for each of a plurality of serviceable devices, the device data for each device including a unique device identifier and associated device status data;
a user interface including a display; and
a display generator configured to generate an image on the display,
the display generator configured to display an image comprised of a device list of serviceable devices on the display,
wherein the user interface is configured to receive filter data from an associated user,
wherein the processor is configured to generate a subset of the device list of serviceable devices in accordance with the received filter data supplied by the user,
wherein the processor is further configured to associate a label with the received filter data used to generate the subset of the device list of serviceable devices,
wherein the processor is further configured to check the label,
wherein the checking of the label by the processor includes one or more of
comparing the label against one or more labels stored in the memory and preventing duplicative labels, or
harmonizing the label relative to associated data content and reducing duplicative labels to a single label,
wherein the processor is further configured to store the label and the received filter data in the memory,
wherein the processor is further configured to receive a device inquiry from the associated user via the user interface,
wherein the display generator is further configured to generate, responsive to the received device inquiry, a label display image including the label,
wherein the processor is further configured to receive a user label selection from the label display image from the user via the user interface, and
wherein the display generator is further configured to generate an image corresponding to the subset of the device list of serviceable devices on the display in accordance with the stored filter data associated with the user label selection.

2. The system of claim 1 further comprising, wherein the user interface is further configured to receive additional filter data from the associated user,
wherein the processor is further configured to generate at least a second subset of the device list in accordance with the received additional filter data,
wherein the processor is further configured to associate at least one added label with the second subset of the device list,
wherein the processor is further configured to store the at least one added label in the memory,
wherein the processor is further configured to receive a second device inquiry from the associated user via the user interface, and
wherein the display is further configured to generate an updated label display image including the at least one added label.

3. The system of claim 2 wherein the user interface is further configured to receive a label selection from the associated user via the user interface, and
wherein the display is further configured to generate a display of a subset of the device list corresponding to the label selection.

4. The system of claim 3 further comprising:
a network interface configured to receive at least a portion of the device status data from each of a plurality of networked, serviceable devices, and
wherein the processor is further configured to store the received device status data in the memory.

5. The system of claim 4 wherein the network interface is further configured to receive the device status data from associated cloud storage.

6. The system of claim 5 wherein the network interface is further configured to receive service data including configuration data corresponding to a current configuration of at least one networked multifunction peripheral.

7. The system of claim 5 wherein the network interface is further configured to receive service data including an error condition associated with at least one networked multifunction peripheral.

8. A method comprising:
receiving, into a portable computer including a display having a user interface, processor and an associated memory, device data for each of a plurality of serviceable devices, the device data including a unique device identifier and associated device status data for each serviceable device;
generating image data corresponding to the received device data;
displaying an image comprised of a device list of serviceable devices on the display in accordance with the generated image data;
receiving filter data from an associated user via the user interface;
generating a subset of the device data in accordance with the received filter data;
associating a label with the received filter data used to generate the subset of the device data;
checking the label by the processor, wherein the checking includes one or more of
comparing the label against one or more labels stored in the memory and preventing duplicative labels, or
harmonizing the label relative to associated data content and reducing duplicative labels to a single label;
storing the received filter data corresponding to the label in the memory;
receiving a device inquiry from the associated user via the user interface; and
generating a label display image including the label responsive to a received device inquiry;
receiving a user label selection from the label display image; and
generating an image corresponding to the subset of the device data on the display in accordance with the stored filter data associated with the user label selection.

9. The method of claim 8 further comprising:
receiving additional filter data from the associated user;
generating at least a second subset of the device data in accordance with the received additional filter data;
associating at least one added label with the received additional filter data used to generate the second subset of the device data;
storing the at least one added label in the memory;
receiving a second device inquiry from the associated user via the user interface; and
generating an updated label display image including the at least one added label.

10. The method of claim 9 further comprising:
receiving a label selection from the associated user via the user interface; and
displaying a subset of the device data corresponding to the label selection.

11. The method of claim 10 further comprising:
receiving at least a portion of the device status data from each of a plurality of networked, serviceable devices; and
storing the received device status data in the memory.

12. The method of claim 11 further comprising receiving device status data from associated cloud storage.

13. The method of claim 12 further comprising receiving service data including configuration data corresponding to a current configuration of at least one networked multifunction peripheral.

14. The method of claim 13 further comprising receiving service data including an error condition associated with the at least one networked multifunction peripheral.

15. A system comprising:
a processor and an associated memory,
the memory configured to store a plurality of data records associated with a corresponding plurality of multifunction peripherals, and
the memory configured to store label data for a plurality of labels, each label being stored with corresponding filter data in the memory;
a network interface configured to interface with an associated data network; and
a touchscreen display interface,
the touchscreen display interface configured to generate a device list of multifunction peripherals on the touchscreen display interface,
the touchscreen display interface configured to generate a label list on the touchscreen display interface, and
the touchscreen display interface configured to receive selection data corresponding to a selected label from the label list,
wherein the processor is configured to order the label list in accordance with the received selection data,
wherein the processor is further configured to generate a filtered device list of multifunction peripherals by application of the stored filter data associated with a label specified by the received selection data,
wherein the touchscreen display interface is further configured to generate an image corresponding to the filtered device list of multifunction peripherals,
wherein the touchscreen display interface is further configured to receive filter data from an associated user,
wherein the processor is further configured to associate a label with the received filter data,
wherein the processor is further configured to check the label, wherein the checking by the processor includes one or more of
comparing the label against one or more labels stored in the memory and preventing duplicative labels, or
harmonizing the label relative to associated data content and reducing duplicative labels to a single label, and
wherein the memory is further configured to store the label and the associated received filter data.

16. The system of claim 15 wherein the network interface is further configured to receive device status data corresponding to a state of each of the plurality of multifunction peripherals, and
wherein the touchscreen display interface is further configured to generate a list of the data records including the device status data.

17. The system of claim 16 wherein the touchscreen display interface is further configured to receive device query data, and wherein the network interface is further configured to receive the plurality of data records in accordance with the received device query data.

18. The system of claim 16 wherein the network interface is further configured to receive the plurality of data records from an associated cloud storage.

19. The system of claim 18 wherein the network interface is further configured to communicate the label and the associated received filter data with the cloud storage.

20. The system of claim 15 wherein the processor is further configured to selectively reapply the received filter data to generate an updated filtered device list.

* * * * *